United States Patent [19]

Benson et al.

[11] 4,397,910
[45] Aug. 9, 1983

[54] LIGHT WEIGHT HIGH TEMPERATURE POLYESTER LAMINATES USEFUL AS LUBRICATING RUB STRIPS

[75] Inventors: Melvin E. Benson, Varnville; Harold O. McCaskey, Allendale, both of S.C.

[73] Assignee: Westinghouse Electric Corp., Pittsburgh, Pa.

[21] Appl. No.: 384,352

[22] Filed: Jun. 2, 1982

[51] Int. Cl.³ ............... B32B 27/02; B32B 27/12; F16C 33/18; F16C 33/20
[52] U.S. Cl. ................. 428/283; 308/DIG. 8; 384/297; 428/288; 428/290; 428/302
[58] Field of Search ............... 308/DIG. 8; 384/297; 428/283, 288, 290, 302, 901

[56] References Cited

U.S. PATENT DOCUMENTS

| | | |
|---|---|---|
| 3,018,206 | 1/1962 | Hood et al. . |
| 3,955,024 | 5/1976 | Goldman et al. ............... 428/901 |
| 3,967,032 | 6/1976 | Plotz et al. . |
| 4,234,651 | 11/1980 | Kuhn et al. . |
| 4,251,587 | 2/1981 | Mimura et al. ............... 428/302 |
| 4,302,499 | 11/1981 | Grisch ............... 428/288 |
| 4,308,313 | 12/1981 | Groff ............... 428/302 |
| 4,343,843 | 8/1982 | Johnson et al. ............... 428/290 |
| 4,360,560 | 11/1982 | Kopnick et al. ............... 428/901 |

*Primary Examiner*—James C. Cannon
*Attorney, Agent, or Firm*—D. P. Cillo

[57] ABSTRACT

A light weight, high temperature, laminate is made of a plurality of heat and pressure consolidated porous, interlocked, needle-punched, polyethylene terephthalate continuous filament mats, impregnated with a thermoset resin to a treated ratio of from about 2 to about 5.

10 Claims, No Drawings

LIGHT WEIGHT HIGH TEMPERATURE POLYESTER LAMINATES USEFUL AS LUBRICATING RUB STRIPS

BACKGROUND OF THE INVENTION

Phenolic resin impregnated asbestos laminates are well known in the art, and taught, for example by Hood et al., in U.S. Pat. No. 3,018,206. Because of their wear resistance and lubricity, asbestos laminates had been used for many years as a rather unique material for rub strips, gaskets, and washers, in high temperature applications. A particularly useful application had been as a wear or rub strip, contacting the chain in the driving mechanisms in forced air textile drying ovens. These ovens operated at between about 150° C. and 200° C., where a high temperature strip material was required, which additionally would not cause excessive wear to the expensive contacting drive chain.

In this type of oven, sets of gears rotating about a vertical axis drive a set of parallel continuous chains, to which supported textile fabric is held therebetween. The "continuous chain" includs a metallic belt or chain used in some fashion to support and continuously pull, drive, or advance the fabric through the oven. The chain cannot be in complete tension, and so, at the middle point between its drawing gears it is displaced downward to some degree from the horizontal plane, where it comes into frictional contact with a supporting wear or rub strip disposed below it.

Various health problems however, have been attributed to asbestos fiber and a substitute is needed rub strips; additionally, asbestos provided a rather heavy substrate which could be impregnated with resin only up to a treated ratio of about 2.2, i.e., about 1.2 lb. of resin solids for each 1 lb. of asbestos.

Resin impregnated glass laminates, tried as an asbestos substitute, have been found very abrasive for rub strip applications. Resin impregnated woven Dacron polyethylene terephthalate cloth, provided a rather expensive, heavy laminate which could not be very highly loaded due to the structure of the weaving. Even brass has been tried, but it is expensive and very heavy. Polyethylene terephthalate in spun bond form has been used as an asbestos substitute in the manufacture of polyvinyl chloride coated, structured floor tiles, as taught by Kuhn et al., in U.S. Pat. No. 4,234,651. There, needled, spun bonded polyethylene glycol terephthalate fiber web had a thermoplastic, styrene-butadiene based binder applied thereto in an amount of up to about 30 wt.% binder solids relative to fiber. The binder was required, to provide high shear strength for the final product.

Plotz et al., in U.S. Pat. No. 3,967,032, also used a spun fleece of polyester monofilaments treated with a thermoplastic, butyl acrylate-styrene binder, containing from 10 wt.% to 30 wt.% of a melamine-formaldehyde precondensate, in an amount of up to about 30 wt.% binder solids relative to fiber. The binder was required, to provide high tensile and flexural strength for the bituminized roof sheet final product, and to solve shrinkage problems. Neither of these binder treated substrates with either polyvinyl chloride or bitumen coatings were directed to high temperature, lubricating laminates.

SUMMARY OF THE INVENTION

The above need has been met and the above problems solved, by providing an impregnated laminate, comprising a plurality of heat and pressure consolidated sheets, each sheet comprising a porous, binder free needle-punched mat of spun laid, polyethylene terephthalate filaments, where the filament melting point is between about 200° C. and about 260° C. This mat is completely impregnated with a thermosetting resin, such as phenolic resin, silicone resin, melamine resin, epoxy resin or polyester resin, which can contain heat resistant fillers, such as aluminum silicate, calcium carbonate, mica, and the like, up to about 60 wt.% of the filler+resin solids weight. The treated ratio can easily be in the range of about 4.15 to 4.3, or approximately 77 wt.% resin and filler, and 23 wt.% mat material.

These impregnated mats are dried, cut, stacked in a heated press, and consolidated and cured or molded at from about 225 psi. to 1,000 psi, at from about 150° C. to 180° C., to provide a laminated article. The resultant laminated article, which is usually from about 1/16 inch to about ¾ inch thick, has excellent high temperature and lubricating properties, is not abrasive, is very highly resin loaded, and is both light weight and inexpensive.

DESCRIPTION OF THE PREFERRED EMBODIMENTS

The substrate for the laminate of this invention is a highly porous, binder free, uncoated mat of nonwoven, mechanically interlocked, randomly distributed, continuous polyethylene terephthalate filaments, preferably a spun laid and needle-punched polyethylene terephthalate filament mat or sheet, where the melting point of the individual filaments is between about 200° C. and about 260° C. Mat thickness usually ranges between 30 mils and 250 mils (0.25 inch), with porosities of between about 75% and 95%. The direct spun polyester filaments are mechanically entangled by "needle-punching", usually where barbed needles are sewn or otherwise punched into or through the mat, to mechanically interlock the filaments, binding them without heat or pressure, to preserve extremely high porosity in the mat with outstanding structural integrity. Needle punching techniques are well known in the art, and produce a pliable mat with no concentrated hard or weak spots. Such needle-punched mats are commercially available and are described, for example, in U.S. Pat. No. 4,234,651.

The resins that are used to completely impregnate the mat are thermosetting resins selected from phenolic resin, silicone resin, melamine resin, epoxy resin, polyester resin, and the like, all of which are well known in the art and are commercially available from many sources. Thermoplastic impregnating resins are not used because the high temperature resistance of the laminate would be reduced.

Fillers that are heat resistant, such as aluminum silicate, calcium carbonate, mica, aluminum trihydrate, talc (a magnesium silicate), their mixtures, and the like can also be used up to about 60 wt.% of the filler and resin solids weight. Filler particle size can range from about 0.5 micron to about 40 micron average diameter. Over 40 micron particle size and the filler will easily settle out of the resin. The mat is highly loaded with resin, so that the "treated ratio" is from about 2.0 to about 5.0, defines as, 1 pound of mat contains from 1 to about 4 pounds of resin solids, or resin solids, plus filler solids. High treated ratio is possible in part due to the high porosity and high structural integrity of the non-woven, needlepunched mat material.

Rolls of the spun laid, needle-punched mat can be passed through a bath of impregnating resin to completely saturate the mat, then passed through a long oven to "B" stage the resin to a dry, non-tacky state, capable of becoming completely thermoset during further heating, and finally cut to size. The mat or sheet has sufficient strength to pass through this continuous treating equipment even at the high resin loading. The cut, impregnated mats can be stacked in a press, usually from 6 to 24 mats depending on the final desired thickness of the laminate, and then laminated at from about 225 psi. to 1,000 psi., at about 150° C. to 180° C., for ½ to 3 hours, to provide the desired heat and pressure consolidated laminate after cooling.

EXAMPLE 1

A roll of non-woven, needle-punched, spunbonded, polyethylene terephthalate filament mat, having a thickness of 60 mils, a melting point of about 250° C., a no-load porosity of 93% and a weight of 5½ ounces/sq. yard (sold by Monsanto Textiles Co. as Bidim C-22 Engineering Fabric) was impregnated with a filled thermosettable silicone resin solution. The resin contained 40 wt.% silicone resin solids, 40 wt.% aluminum silicate filler having an average particle size of about 1 micron, and 20 wt.% toluene solvent. The filler thus constituted 50 wt.% of the filler-resin solids weight. The mat was dipped in a bath of the resin solution and passed through a metering roll to give a treated ratio of about 4.2, or approximately 76 wt.% resin and filler solids and 24% mat material (3.2 unit wt. resin and filler solids and one unit wt. mat, or 3.2/4.2=0.76). The resin treated mat was then passed through a forced air drying oven to give a greenness of 1.7% and to "B" stage the resin.

Stack ups containing 6, and 23 impregnated mats were placed in a press and heat and pressure consolidated between steel pressing plates at 250 psi. and 180° C., for 2¼ hours. The laminates were then cooled under pressure and released, to provide ⅛ inch and ½ inch laminates respectively. The resulting laminates were light weight, heat resistant up to about 250° C. and had lubricating surface qualities. Mechanical, physical and electrical properties were found to be very good, as shown below in Table 1:

TABLE 1

|  | ⅛ inch | ½ inch |
|---|---|---|
| Impact Strength (edgewise, with grain) | 2.64 ft. lb. | 3.16 ft. lb. |
| Impact Strength (edgewise, cross grain) | 2.49 ft. lb. | 2.20 ft. lb. |
| Compressive Strength (flatwise) | 23,330 psi. | 20,990 psi. |
| Specific Gravity (g/cu.cm.) | 1.62 | 1.64 |
| Parallel Dielectric Strength D-48/50 (NEMA Conditioning) | 34.5 KV | 25.5 KV |

EXAMPLE 2

A roll of non-woven, needle-punched, spunbonded, polyethylene terephthalate filament mat, having a thickness of 60 mils, a melting point of about 250° C., a no-load porosity of 93% and a weight of 5½ ounces/sq. yard (sold by Monsanto Textiles Co. as Bidim C-22 Engineering Fabric) was impregnated with a thermosettable phenolic resin solution. The mat was dipped in a bath of the resin solution and passed through a metering roll to give a treated ratio of about 2.3, or approximately 56.5 wt.% resin and filler solids and 43.5% mat material. The resin treated mat was then passed through a forced air drying oven to give a greenness of 3.5% and to "B" stage the resin.

Stack ups containing 11 and 45 impregnated mats were placed in a press and heat and pressure consolidated between steel pressing plates at 500 psi. and 160° C., for 1 hour. The laminates were then cooled under pressure and released to provide ⅛ inch and ½ inch laminates respectively. The resulting laminates were light weight, heat resistant up to about 250° C., and had lubricating surface qualities. Mechanical, physical and electrical properties were found to be very good, as shown below in Table 2:

TABLE 2

|  | ⅛ inch | ½ inch |
|---|---|---|
| Impact Strength (edgewise, with grain) | 5.39 ft. lb. | 6.35 ft. lb. |
| Impact Strength (edgewise, cross grain) | 3.19 ft. lb. | 3.76 ft. lb. |
| Compressive Strength (flatwise) | 31,920 psi. | 36,010 psi. |
| Specific Gravity (g/cu.cm.) | 1.35 | 1.32 |
| Parallel Dielectric Strength D-48/50 (NEMA Conditioning) | 25 KV | 9 KV |

Two laminates made as above, except molded 1 hour at 500 psi. and 160° C., approximately 48 in.×96 in.×⅛ in. thick, were evaluated as rub strip material and were found to have good high temperature lubricity, low abrasiveness, and long life. These laminates would be an excellent substitute for brass, or abrasive resin filled fiber glass chain rub strips, for the chain driving mechanism in forced air textile drying ovens. They may also be useful in a variety of electrical applications.

We claim:

1. A high temperature lubricating laminate rub strip comprising a plurality of heat and pressure consolidated resin impregnated mats, each resin impregnated mat comprising a porous, non-woven, interlocked, polyethylene terephthalate filament mass, impregnated with a thermoset resin to a treated ratio of from about 2 to about 5.

2. The laminate of claim 1, where the mat is needle-punched, and the filament melting point is between about 200° C. and about 260° C.

3. The laminate of claim 1, where the mat is over about 75% porous, and is impregnated with a resin selected from the group consisting of phenolic resin, silicone resin, melamine resin, epoxy resin and polyester resin.

4. The laminate of claim 1, where the impregnating resin also contains filler particles.

5. The laminate of claim 1, where the impregnating resin also contains filler particles selected from the group consisting of aluminum silicate, calcium carbonate, mica, aluminum trihydrate, talc, and mixtures thereof, the filler being added up to about 60 wt.% of the filler plus resin solids weight.

6. The laminate of claim 1, where the mat is between about 75% and 95% porous, contains continuous filaments, where the filament melting point is between about 200° C. and about 260° C., and is impregnated with phenolic resin.

7. The laminate of claim 1, as a rub strip in an oven operating at a temperature of between about 150° C. and 200° C.

8. The laminate of claim 1, as a chain rub strip in a forced air textile drying oven operating at a temperature of between about 150° C. and 200° C.

9. A lubricating rub strip suitable for frictional contact with a metal at a temperature up to about 200° C., said rub strip comprising a heat and pressure consolidated laminate of a plurality of resin impregnated mats, each resin impregnated mat comprising a sheet of porous, interlocked, continuous polyethylene terephthalate filaments, impregnated with a thermoset resin to a treated ratio of from about 2 to about 5.

10. The rub strip laminate of claim 9, where the sheet is non-woven and needle-punched, and comprises binder free randomly distributed continuous filaments of polyethylene terephthalate where the filament melting point is between about 200° C. and about 260° C., the sheet is over about 75% porous, and is impregnated with a resin selected from the group consisting of phenolic resin, silicone resin, melamine resin, epoxy resin and polyester resin.

* * * * *